United States Patent [19]

Corsmeier

[11] 3,722,058
[45] Mar. 27, 1973

[54] FASTENING DEVICE AND COOPERATING TOOL MEANS

[75] Inventor: Robert J. Corsmeier, Cincinnati, Ohio

[73] Assignee: General Electric Company

[22] Filed: Sept. 30, 1971

[21] Appl. No.: 185,321

[52] U.S. Cl. .................................................29/200 D
[51] Int. Cl. ...........................B23p 19/04, F16c 43/00
[58] Field of Search..29/200 D, 200 R, 200 B, 200 P, 29/200 J; 64/9

[56] References Cited

UNITED STATES PATENTS

| | | | |
|---|---|---|---|
| 2,785,550 | 3/1957 | Petrie | 64/9 |
| 3,571,886 | 3/1971 | Corsmeier | 29/200 D |

*Primary Examiner*—Thomas H. Eager
*Attorney*—Frank L. Neuhauser et al.

[57] ABSTRACT

Fastening means include a threaded main body member and resiliently movable locking means for preventing relative rotation between the main body member and the shaft when the former has been threaded to its desired position on the shaft. Cooperating tool means are provided for installing and removing the fastener means and include inner and outer telescoped tools which are formed with radial ears which interfit with axially extending main body member lugs so as to grip and transmit torque to the main body member. The inner tool includes an annular portion which telescopes within the main body member to resiliently deflect the locking means during installation and removal.

8 Claims, 6 Drawing Figures

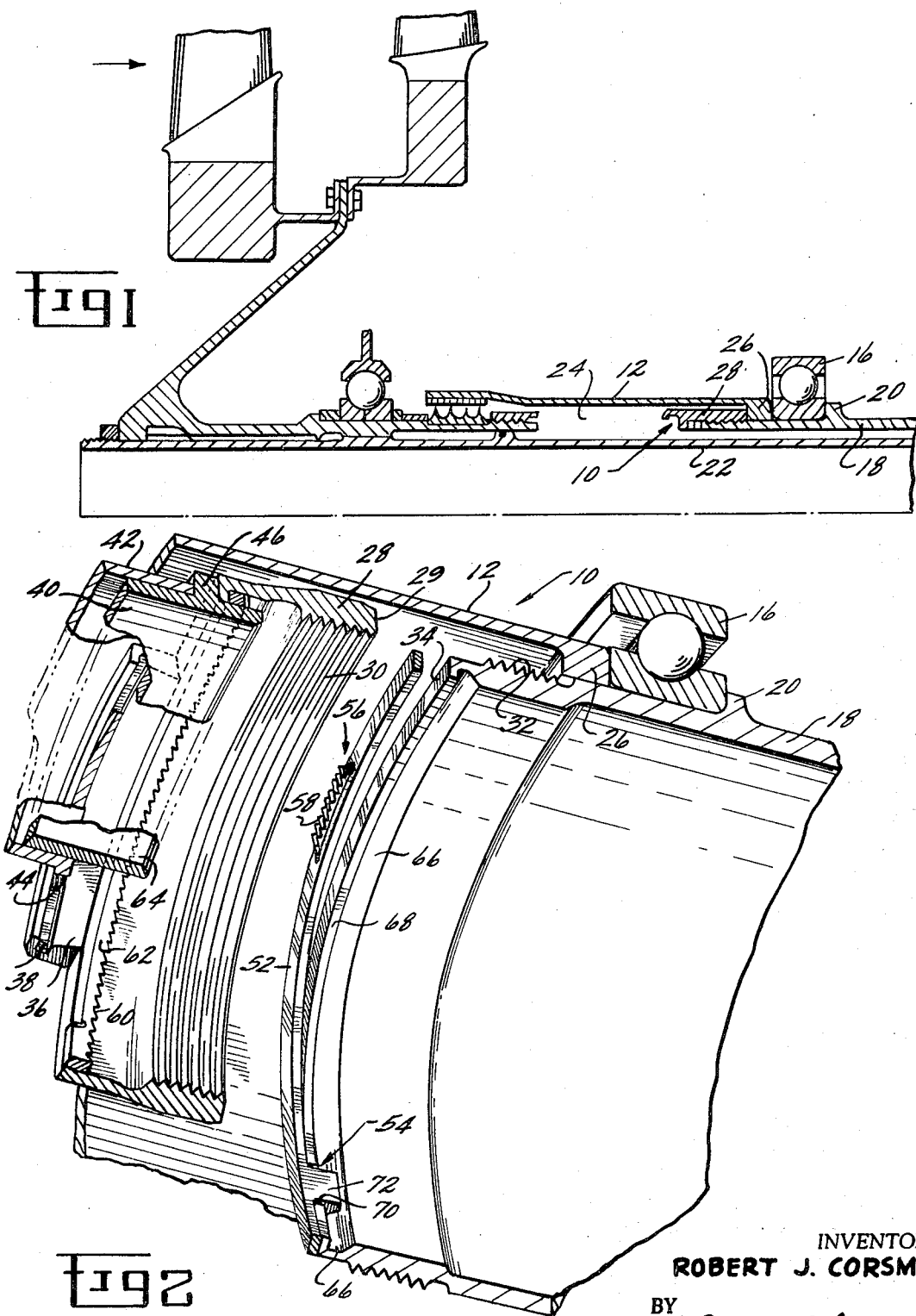

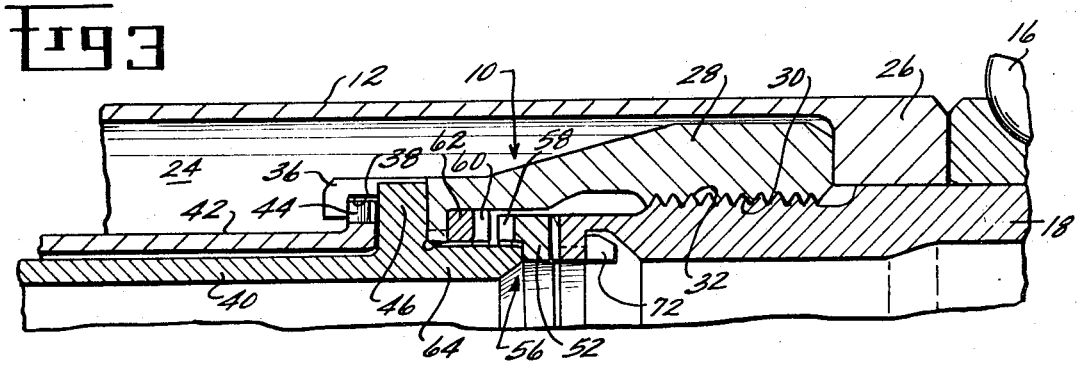
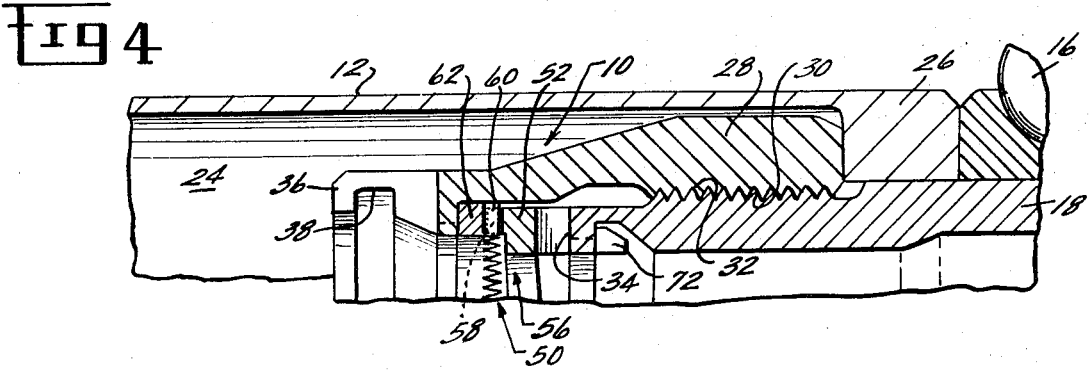
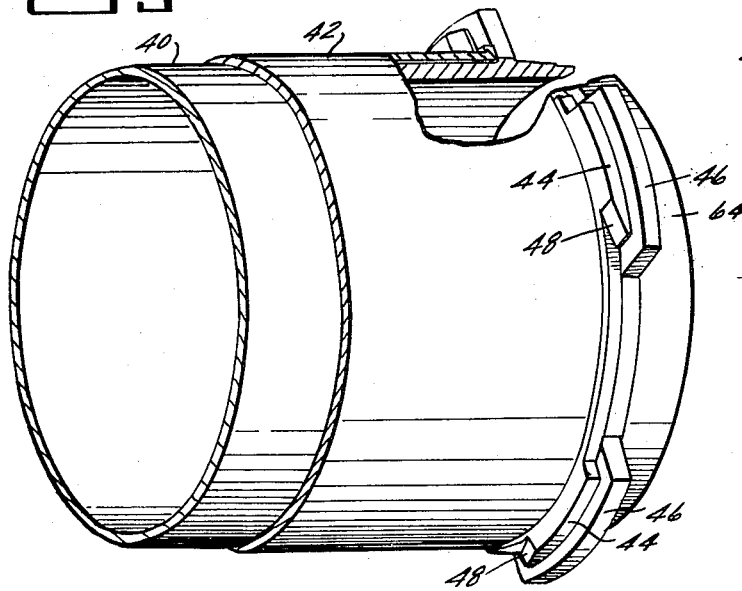
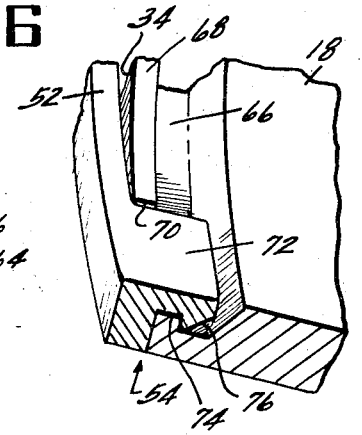
INVENTOR.
ROBERT J. CORSMEIER
BY
ATTORNEY-

FASTENING DEVICE AND COOPERATING TOOL MEANS

This invention relates to fastening means and cooperating tool means therefor and, more particularly, to means for removably fastening components to a shaft member in a remote, inaccessible location, as for example, on a shaft of a dual-shafted gas turbine engine.

In rotating machinery, such as gas turbine engines, it is often necessary or desirable to removably fasten components such as bearings, seals, gears, splines and the like to a shaft. In many such applications, installation and/or removal of the fastening device must be accomplished in a relatively inaccessible or axially remote limited annular area along the shaft. Further, it may be desirable to remove such components for inspection, overhaul and maintenance purposes without necessitating removal of the shaft.

One solution to the foregoing problem which has been used heretofore employs what would amount to a third shaft or tube member which carries the shaft components at one end and extends along the shaft to an accessible portion of the shaft where it is secured to the shaft. While this approach permits installation and removal of shaft components in relatively inaccessible areas, it has certain characteristics which limit its usefulness. Specifically, a long tube member can substantially increase the weight of the rotating machinery which, in the case of an aircraft gas turbine engine, is extremely undesirable. Additionally, such an arrangement may cause significant imbalance during engine operation and is not well suited for transmitting torsional loading which, for example, would be present when the shaft component is gear or spline.

Another solution which involves the use of a separate component carrier member is shown in U.S. Pat. No. 3,571,886.

The present invention is concerned with a shaft component fastening element and cooperating tool means for removably securing components to a shaft in a reliable, economical manner and in a manner that prevents inadvertent loosening of the fastening means.

While the specification concludes with the claims particularly pointing out and distinctly claiming the subject matter of this invention, it is believed that the invention will be better understood upon reading the following description of the preferred embodiment in conjunction with the accompanying drawings wherein:

FIG. 1 is a partial cross-sectional view showing the fastening means of this invention installed on the outer shaft of a dual-shafted gas turbine engine;

FIG. 2 is a partial perspective view, drawn to an enlarged scale, of the fastening means of FIG. 1 together with the cooperating tool means of this invention;

FIG. 3 is an enlarged partial cross-sectional view, like FIG. 1, showing the fastening means of this invention in a partially installed position on the shaft together with the cooperating tool means of this invention;

FIG. 4 is a view like FIG. 3 showing the fastening means of this invention installed on the outer shaft;

FIG. 5 is a partial perspective view of the cooperating tool means of this invention; and FIG. 6 is an enlarged partial perspective view of the upstream end of the shaft of FIG. 2.

Referring now to the drawings, and particularly to FIG. 1, the fastening means of this invention have been shown at 10 in an exemplary installation wherein such means operate to axially fasten or secure a tubular seal carrying member 12 and a bearing 16 to the outer shaft 18 of a dual-shafted gas turbine engine by urging such elements against a shaft shoulder 20.

As shown in FIG. 1, the seal carrying member 12 telescopes over the fastener means 10 and extends substantially upstream thereof so as to define, in cooperation with an inner shaft 22, an annular passage 24 of limited radial height. The seal carrying member 12 is secured to the shaft 18 by a radially inwardly extending flange 26.

Turning now to the partial perspective view of FIG. 2, the fastening means 10 of this invention has been shown as including hollow body member 28 which is formed at one end 29 with internal threads 30 for engagement with shaft external threads 32 which are formed adjacent the upstream end 34 of the shaft 18. At its other or upstream end, the main body member 28 is formed with a plurality of axially projecting, peripherally spaced, arcuate lugs 36. Each lug 36 is formed with a radially inwardly facing circumferential groove 38.

As best shown in FIGS. 2 and 3, the cooperating tool means of this invention comprises inner and outer telescoped annular members 40 and 42, respectively. The distal end of the outer tool member 42 carries a plurality of circumferentially spaced, radially outwardly projecting ears or lugs 44. The ears 44 are sized and circumferentially spaced such that each ear 44 will engage a respective slot 38 of a main body member lug 36. The inner tool 40 is likewise formed with a plurality of circumferentially spaced, radially outwardly extending ears or lugs 46 which are sized and spaced such that they will engage and project between the main body member lugs 36, as best shown in FIG. 3. With reference to FIG. 5, each outer tool member ear 44 may be formed with a ramp or scarfed edge 48 at each circumferential end to facilitate insertion of the ear into its lug groove 38.

Locking means, as shown generally at 50, are provided to prevent inadvertent unthreading or loosening of the main body member 28 from its installed position of FIG. 4. The locking means 50 have been shown as including a locking ring 52 which is suitably bowed or deformed out of the plane of the upstream shaft end 34 so that the ring will abut the shaft end 34, as at 54, and will project axially upstream of and out of abutment with the shaft end 34, preferably in at least two diametrically opposed places, as at 56. The bowed ring 52 is formed out of a suitable material so that its projecting portion 56 may be yieldingly and resiliently urged axially toward shaft end 34. Means, such as axially projecting teeth 58 are carried by the locking ring 52 at its projecting portions 56 which engage similarly formed teeth or serrations 60 carried by the main body member 28. The teeth 60 may be formed integrally in the main body member 28 or they may be formed in a ring 62, as shown in FIGS. 2 – 4, which is suitably secured internally of the main body member 28.

The inner tool 40 includes an annular portion 64 which extends axially beyond the ears 46 sufficiently to abut the locking ring 52 at its projecting portions 56 and inwardly of the locking teeth 58, as best shown in FIG. 3, so as to resiliently deflect the locking ring 52 toward the shaft end 34 and thereby prevent locking engagement of teeth 58, 60 during installation and removal of the main body member 28.

To facilitate attachment of the locking ring 52 to the shaft 18 in a manner which prevents relative rotating of the parts, the shaft may be formed with an inner circumferential groove 66 adjacent shaft end 34 so as to define a flange 68 therebetween. The flange 68 is slotted, as at 70, to receive lugs 72 which project axially from abutting locking ring portions 54. As best shown in FIG. 6, the lugs 72 are formed with an outwardly facing, circumferentially extending groove 74 which snaps over and is sized to receive the portion of the flange 70 residing radially outwardly of groove 70 so as to axially and rotationally lock the ring 52 to the shaft. The ring lugs 72 may be formed with an external ramp 76 at their distal ends to facilitate snapping the lugs 72 into locking engagement with the shaft.

The use, operation and function of the invention are as follows:

With the outer tool 42 telescoped over the inner tool 40 and with the outer tool ears 44 abutting and generally aligned with the inner tool ears 46, the tool means may be axially engaged with the main body member 28 such that each pair of abutting ears projects between a pair of main body member lugs 36 and annular portion 64 telescopes within the main body member 28. The outer tool 42 may then be rotated to engage each ear 44 of the outer tool 42 with a lug groove 38 to thereby lock the main body member 28 to the tool means. The tool means and main body member may then, as in the example of FIG. 1, be telescoped over the inner shaft 22 and threadably engaged to the shaft 18 by rotating the inner and outer tools 40 and 42 in unison, it being understood that the driving torque would be transmitted from the tool 40 to the main body member 28 through abutting ears and lugs 46 and 36, respectively. As the main body member 28 is progressively engaged with shaft threads 32, the projecting portion 64 abuts the projecting portions 56 of bowed locking ring 52 and resiliently deflects such portions toward the shaft 18 so as to prevent locking engagement of means 50. When the fastener element 28 has been threadably engaged to the desired depth with shaft threads 32, as for example to the position of FIG. 1 wherein the main body member clamps the flange 26 and bearing 16 axially tight against the shaft shoulder 20, the outer tool 42 is rotated to disengage the ears 44 and the lug grooves 38 and the tool is axially withdrawn from the fastener element 28, whereupon the projecting locking ring portions 56 resiliently move axially away from shaft 18 and teeth 58, 60 engage as shown in FIG. 4. In this manner relative rotation of the main body member or fastener element 28 and the shaft 18 and, hence, inadvertently loosening is prevented.

To remove the fastener of this invention from its installed position of FIG. 4, the tool means is engaged with the fastener element 28, as described above, so as to deflect the ring 52 out of locking engagement with teeth 60, and the fastener element 28 is rotated out of threaded engagement with the shaft under the urging of inner tool 40.

While an arrangement for securing the locking ring 52 to the shaft 18 has been depicted and described as comprising interlocking lugs 72 and slotted flange 68, it should be understood that other suitable means may be used to secure the ring 40 to the shaft 18 in a manner which prevents relative rotation between the ring and the shaft.

From the foregoing, it will be appreciated that the present invention provides means for quickly and easily securing, in a readily removable member, components to a shaft in an axially remote position of limited annular area.

While a preferred embodiment of the fastening means and cooperating tool means of this invention have been depicted and described, such is intended to be exemplary only and not definitive, and it will be appreciated that many changes, modifications and substitutions may be made thereto without departing from the fundamental theme of the invention.

What is claimed is:

1. Means for fastening elements to a shaft, said means comprising:
   an annular main body member having first and second axial ends, said annular member having internal threads adjacent said first end for threadably engaging said main body member to a desired position along cooperating threads formed at one end of said shaft, and
   means for locking said main body member to said shaft at said desired position so as to prevent relative rotation and, hence, loosening of the threaded engagement therebetween, said locking means including means carried by said shaft and normally projecting axially out of abutment with said shaft and into locking engagement with said main body member when the latter is in said desired position, said projecting means being resiliently movable out of said locking engagement to permit installation and removal of said main body member.

2. The structure of claim 1 further characterized in that said projecting means comprise a locking ring which is bowed axially such that it abuts said threaded shaft end in at least two places and projects axially away from said threaded shaft end in at least two places.

3. The structure of claim 2 further characterized in that said projecting portions of said locking ring are formed with teeth extending therefrom and adapted to engage cooperating teeth carried by said main body member.

4. The structure of claim 2 further characterized in that said shaft is formed with a radially inwardly extending flange at said threaded end, said locking ring including axial lugs at said shaft abutting portions which extend oppositely to said projecting portions and are formed with a peripherally extending, outwardly facing slot sized to receive said flange, said flange formed with an axial slot for each said lug, whereby said lugs may be snapped into connection with said shaft in a manner preventing relative rotation therebetween.

5. The structure of claim 1 further characterized in that said main body member is formed with a plurality of arcuate lugs extending axially from said second end, said lugs being circumferentially spaced to receive radial ears of a first tool to facilitate transmittal of installation and removal torque thereto.

6. The structure of claim 5 further characterized in that each said lug is formed with an inwardly opening circumferential groove, each said groove being sized to receive radial ears of a second tool.

7. Tool means for use in threadably installing and removing fastening means to and from a desired position on a shaft, said fastening means including an annular main body member having internal threads formed at a first end and a plurality of circumferentially spaced lugs extending axially from a second end, with each said lug formed with an inwardly opening circumferential groove, and locking means carried by said shaft and resiliently projecting axially therefrom for locking engagement with said main body member when the latter is in its desired position on said shaft, said tool means comprising:
 a first tool having a plurality of radially projecting ears adjacent one end thereof, said ears being circumferentially spaced and sized to project radially between circumferentially adjacent one of said main body member lugs, said first tool having an annular portion extending axially beyond said ears and adapted to telescope within said annular main body member,
 a second tool telescoped over said first tool and into abutment with said first tool ears, said second tool formed with a radial ear for each said main body member lug which is sized for engagement with said lug groove to lock said tool means to said main body member,
 with said telescoping annular portion of said first tool being sized to abut said locking means and resiliently deflect said means out of locking engagement with said main body member during installation and removal of said main body member.

8. The structure of claim 7 further characterized in that said first tool is annular.

* * * * *